United States Patent [19]

Risser et al.

[11] 4,045,041
[45] Aug. 30, 1977

[54] WHEEL ADJUSTMENT MECHANISM FOR A FORAGE BLOWER

[75] Inventors: Roger L. Risser, Leola; Joe E. Shriver, East Earl, both of Pa.

[73] Assignee: Sperry Rand Corporation, New Holland, Pa.

[21] Appl. No.: 686,615

[22] Filed: May 14, 1976

[51] Int. Cl.² .................................................. B62D 21/18
[52] U.S. Cl. ................................ 280/43.17; 280/43.24
[58] Field of Search ................... 280/43, 43.17, 764, 280/763, 43.18, 43.23, 43.24; 302/37

[56] References Cited

U.S. PATENT DOCUMENTS

| | | | |
|---|---|---|---|
| 2,225,157 | 12/1940 | Court | 280/764 |
| 2,698,770 | 1/1955 | Sickle | 302/37 |
| 3,778,078 | 12/1973 | Onder | 280/43 |

*Primary Examiner*—Robert R. Song

*Attorney, Agent, or Firm*—Michael R. Swartz; Frank A. Seemar; John B. Mitchell

[57] ABSTRACT

A forage blower having a frame with a wheel pivotally mounted on each side of the frame incorporates an improved adjustment mechanism for adjusting the blower unit in a plurality of vertical positions relative to the ground. The wheels are independently adjusted by the improved mechanism which includes an arcuate shaped downwardly facing bracket mounted on the frame and interconnected by a threaded rod to pivotal arm means which rotatably mounts the wheel. The lower end of the rod is threaded within a swivel nut which is rotatably mounted on the arm means. An engaging member, conforming to the arcuate shape of the bracket, is mounted on the rod below the bracket and positioned in mated relationship with the bracket such that the forces due to the weight of the blower unit are distributed over a large area thereby facilitating rotation of the screw threaded rod.

13 Claims, 5 Drawing Figures

WHEEL ADJUSTMENT MECHANISM FOR A FORAGE BLOWER

BACKGROUND OF THE INVENTION

1. Field of the Invention

The present invention relates generally to forage blowers and more particularly is directed to an adjustment mechanism for disposing the forage blower in a plurality of vertical positions relative to the ground.

2. Description of the Prior Art

Forage blowers are used to elevate crop material, such as silage, grain and the like into silos, storage bins, etc. The crop material is brought in from the fields in wagons and dumped into a generally horizontal feed table or trough having an auger, rotor impeller or other conveyor means which feeds the material to a high speed vertical fan, commonly referred to as a "blower," that blows or throws the material upwardly through a discharge pipe to the top of a silo or other storage facility.

The vertical blower is usually driven from the power take-off of a tractor which turns the fan at 540 rpm, or as in some of the larger new models, at 1000 rpm. The high speed of the fan, in forcing the crop material upwardly through the discharge pipe, creates an extreme amount of vibration which causes the blower unit to move about or gyrate on the ground. In addition to the vibration caused by the vertical fan, some vibration is also generated by the feed means, especially those units having a horizontal rotor type impeller.

It is necessary to provide a stationary support for the blower unit and thus, it has been the coutomary practice, to rest the unit on the ground, using its weight and broad base as a stabilizing factor. Another means of stabilizing the blower is through the use of a jack stand in combination with a set of fixed wheels as illustrated in U.S. Pat. No. 3,466,095.

Usually forage blowers are considered mobile units, to be transported from one site location to another, and thus are provided with transport wheels. Generally, these transport wheels are removably mounted such that the blower unit can rest on the ground during operation. Other units are provided with a mobile transport frame of the type appearing in U.S. Pat. No. 2,757,811. And, still other units are provided with retractable wheels, movable between transport and non-transport modes as illustrated in U.S. Pat. Nos. 2,639,949; 2,695,816; and 2,698,770. In each case, blocking or shimming is usually required to level the unit on uneven ground. This is especially pertinent to those units that are required to be level for efficient operation.

In operation, the blower unit is positioned at the base of the silo and its discharge spout is connected to a vertically extending silo fill pipe so that forage material can be transferred to the top of the silo. This connection has always caused a problem, generally requiring a shifting or adjusting of the blower unit such that the discharge spout properly aligns with the fill pipe. Some units are provided with adjustable discharge spouts to facilitate this alignment problem; however, such structure brings added costs and expense to the units.

The prior art attempts known heretofore for transporting a forage blower which provides a stable and sturdy base for the unit during operation thereof and which facilitates connection of the discharge spout to the silo fill pipe are cumbersome, complicated in structure, costly, time consuming and inconvenient for the operator to use.

SUMMARY OF THE INVENTION

It is, accordingly, the principal object of the present invention to provide a forage blower in which the aforementioned problems of the prior art have been overcome. More particularly, it is an object to provide an agricultural machine, such as a forage blower, with means for transporting the blower and which can also be used to support the unit in a stationary position during operation thereof. It is a further object of the present invention to provide means for leveling the blower unit which also has the added feature of facilitating the alignment of the discharge spout of the blower unit with the silo fill pipe.

In pursuance of these and other objects, the present invention contemplates a new and improved adjustment mechanism for use on a forage blower having at least one ground engaging element, such as a wheel, movably mounted on the blower frame to support the frame at a plurality of vertical positions relative to the ground.

In the preferred embodiment of the invention, the improved adjustment mechanism comprises an arcuate shaped bracket mounted on the blower frame so as to open generally downwardly and means interconnecting the ground engaging element to the bracket, the interconnecting means being actuatable to cause relative movement between the ground engaging element and the bracket for adjusting the vertical position of the frame relative to the ground. The interconnecting means includes a threaded rod pivotally connected at one of its ends to the ground engaging element with its other end extending upwardly through the bracket. An engaging member conforming to the arcuate shape of the bracket, is mounted on the rod, below the bracket, and positioned in a mated relationship with the bracket such that the forces exerted on the interconnecting means by the weight of the blower unit is distributed over a large area. This distribution of forces results in less force per unit area thereby facilitating actuation of the interconnecting means. The blower unit is vertically adjusted by rotating the rod which causes relative movement between the ground engaging element and the frame.

These and other advantages and attainments of the present invention will become apparent to those skilled in the art upon a reading of the following detailed description when taken in conjuction with the drawings in which there is shown and described an illustrative embodiment of the invention.

BRIEF DESCRIPTION OF THE DRAWINGS

In the course of the following description, reference will be frequently made to the attached drawings in which.

DETAILED DESCRIPTION OF THE INVENTION

In the following description, right hand and left hand references are determined by standing at the rear of the machine facing in a direction of forward travel. Also, in the following description, it is to be understood that such terms as "forward," "rearward," "left, " "upwardly," etc., are words of convenience and are not to be construed as limiting terms.

IN GENERAL

Figure 1:
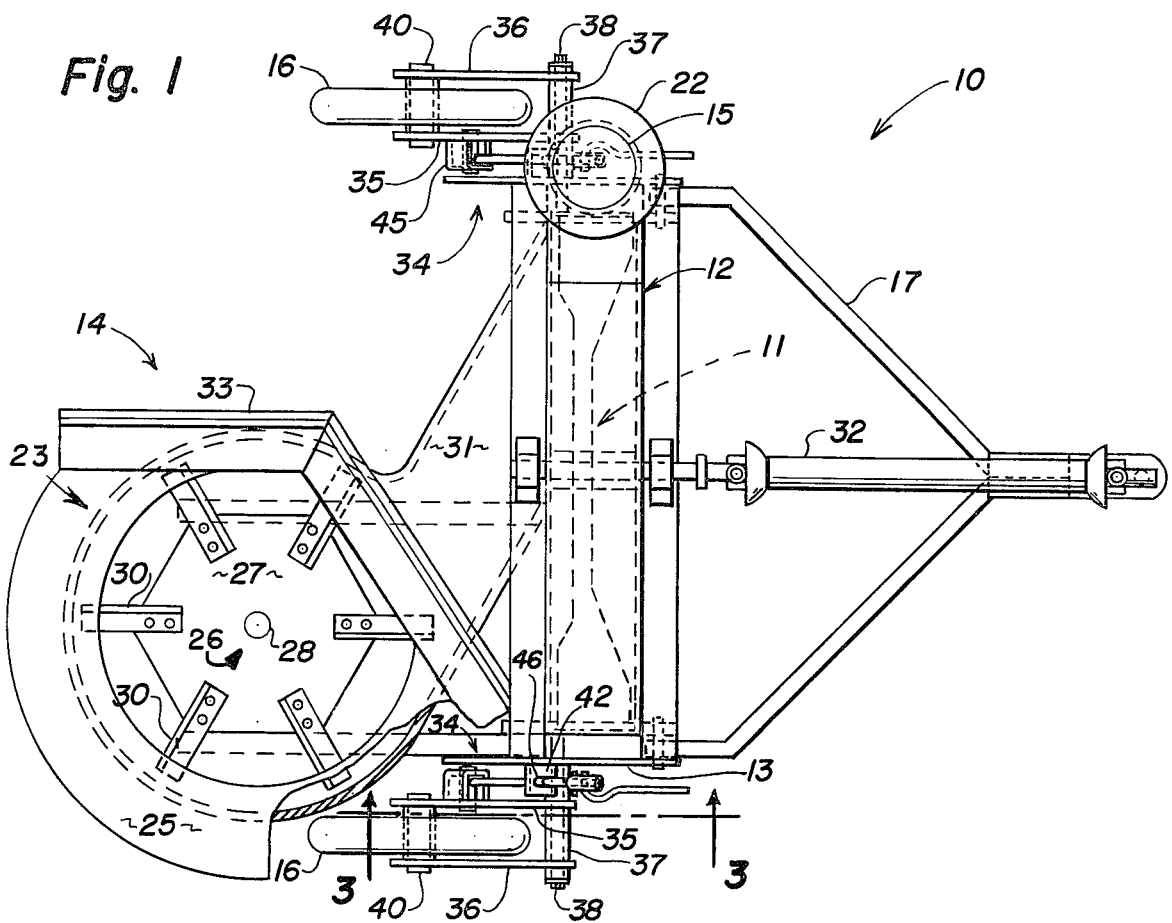
FIG. 1 is a plan view of a forage blower embodying the principles of the present invention with the feed hopper being partially removed to clearly illustrate the right wheel and the improved adjusting mechanism associated with it.

Referring now to the drawings, and particularly to FIG. 1, a crop material handling apparatus, such as a forage blower, generally indicated by the numeral 10, is shown for illustrational purposes as incorporating the improved adjustment mechanism of the present invention. Although, the improved adjustment mechanism is shown as being incorporated in a forage blower of the type having a horizontal rotor-type impeller feed means, it will become apparent to those skilled in the art that the improved adjustment mechanism of the present invention is not specifically limited, in its potential applications, solely to forage blowers having rotor-type feed means, nor, for that matter, generally limited to forage blowers of varying types, but may be applied or adapted to the general class of mobile agricultural machines, such as, in addition to forage blowers, to mowers, mower conditioners, swathers, rakes or the like, as desired.

The blower unit 10 is of the type shown and described in detail in U.S. Pat. No. 3,594,047 and is especially adapted for use in the pneumatic conveyance of forage material, such as silage, grain, etc., into silos, storage bins, and the like. Briefly, the blower unit 10 comprises a vertical rotor or fan 11, journalled for rotation within a housing 12, supported on frame 13. Feed means 14 feeds material to fan 11 which conveys the material, at a relatively high velocity, upwardly and out a discharge spout 15 and though a fill pip (not shown) normally connected to the top of the discharge spout for the purpose of conducting material to a relatively high elevation, as to the top of a silo or other storage building. The unit 10 is further provided with a pair of transport wheels 16, one being mounted on each side of the frame 13, and a forwardly extending tongue assembly 17, connected to the frame 13 for hitching the blower unit 10 to a tractor or other vehicles so that it can be towed from place to place, like a trailer.

More particularly, the blower housing 12 comprises a pair of parallel, spaced apart, circular sidewalls 18, 20 and an annular band or wrapper 21 of sheet metal extending between the sidewalls 18, 20 and around the major portions of their peripheries. The band 21 has an opening in the fourth quadrant, as viewed from the rear of the blower unit, from which the transition discharge spout 15 extends. The lower end of the spout 15 is shaped to conform to the housing 12 and has an outer sidewall portion tangent to the peripheral edge of the circular sidewalls 18, 20. The spout 15 extends upwardly, gradually changing into a cylindrical shape at the flange ring 22 which is adapted to be connected to a silo fill pipe (not shown) for the conveyance of the material to the top of the silo.

The feed means 14 includes a hopper 23 having a circular sidewall 24 with a circular cone shaped lip 25 extending outwardly and inwardly above the sidewall 24 defining a feed opening through which material is dropped onto a horizontal rotor-type impeller 26. The horizontal rotor 26 comprises a hexagonal-shaped support plate 27 mounted on shaft 28 which is supported in bearings (not shown) for rotation of plate 27 within the bottom of the hopper 23. Fastened to each corner of the support plate 27 are six radially extending blades 30.

A transition member 31 provides for communication of material through the discharge outlet, defined in the circular wall 24 of the hopper 23, to fan 11, through an inlet opening in the rear wall 20 of the blower housing 12. The transition member 31 has one side tangential to the circular hopper and extends at an angle to the housing 12 to introduce the feed material at an acute angle to the direction of rotation of the blades of the fan 11. Preferably, the sidewalls of the transistion member 16 converge toward the blower housing 12 so as to provide area for the existence of air and crop material into the transition member and to the fan.

The blower or fan 11 and the horizontal feed rotor 26 are driven from the power take-off shaft 32, connected to a tractor (not shown), through an arrangement of drives, belts and pulleys all of which not being shown for the sake of brevity and for the reason that such drive means forms no part of this invention.

During operation of the blower unit 10, material is dumped from a forage wagon into the hopper 23 of the feed means 14 and is guided into the feed opening, defined by the circular cone 25, by a baffle 33 which extends across the hopper 23 to the side of the center of rotation of the rotor and along the discharge side of the horizontal impeller. The material falls on top of the spinning support plate 27 and is thrown outwardly into the path of the blades 30 which impel the material through the transition member 31 and into the fan 11 in a disintegrated airborne condition. The fan 11 then forces this disintegrated material upwardly through the discharge spout 15 and fill to the top of the silo.

The mounting of the wheels will now be discussed in detail in conjuction with the following detailed discussion of the new and improved adjustment mechanism of the present invention.

IMPROVED WHEEL ADJUSTMENT MECHANISM

Figure 2:
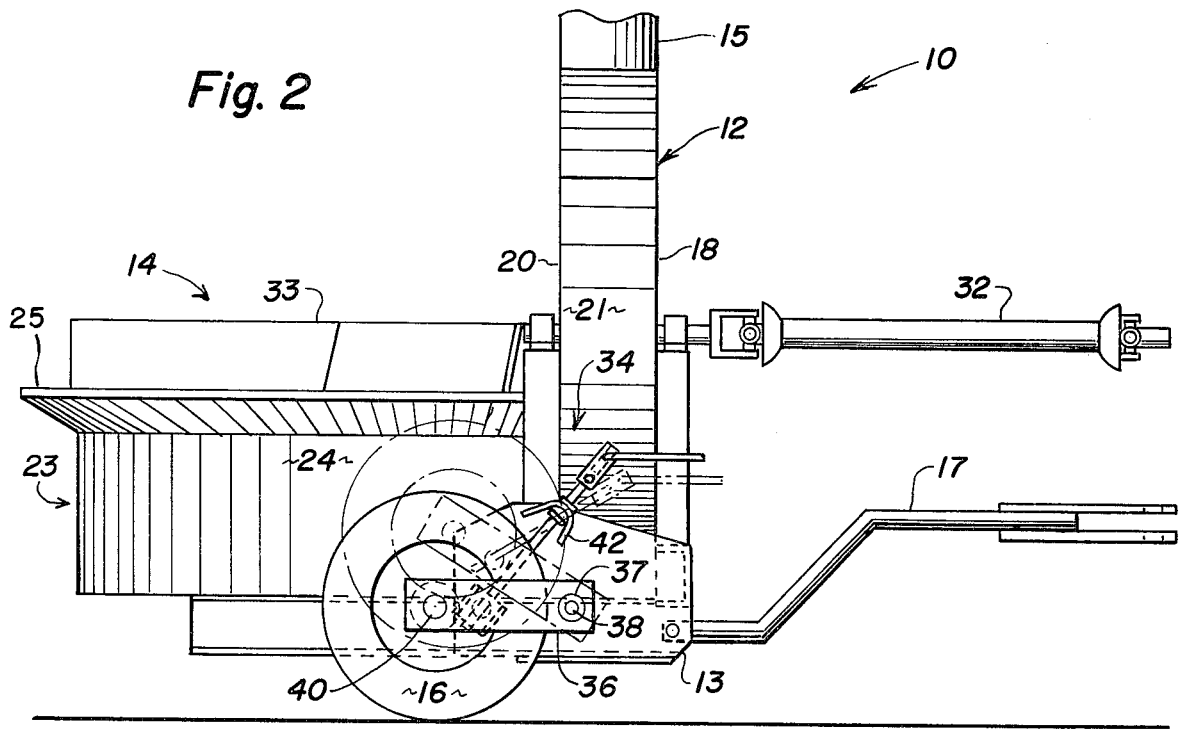
FIG. 2 is a side elevational view of the forage blower of FIG. 1 with the right wheel being shown in solid line form, engaging the ground to support the blower unit in its transport mode, and in broken line form, in a retracted position, wherein the blower unit rests on the ground.

As seen in FIG. 1, a ground engaging element, such as wheel 16, is mounted on each side of the blower frame 13. Associated with each wheel 16, is the improved adjustment mechanism of the present invention, being generally indicated by the numeral 34, whereby each wheel 16 can be independently adjusted such that the blower unit 10 can be raised from a ground resting position as shown in solid line form in FIG. 4 (the raised position of the wheel 16 is also shown in broken line form in FIG. 2), to a transport position as shown in solid line form in FIG. 2 and 3. Since the mounting of each wheel is identical, except for being on opposite sides of the machine, and since the improved adjustment mechanism associated with each wheel is the same, only the right wheel and its corresponding adjusting mechanism will be described in further detail.

The means for mounting wheel 16 on frame 13 includes two spaced apart flat arms 35, 36 having one end suitably fixed, such as by welding, to a hub 37, rotatively mounted on a stub shaft 38. The stub shaft 38 extends 90° outwardly from frame 13 at the lower end of the blower housing 12 and adjacent the rear wall 20 thereof. Wheel 16 is rotatively mounted between the opposite ends of arms 35, 36 on axle 40 within bearings 41. The arrangement of the structure just described permits the wheel 16 to pivot about stub shaft 38.

Figure 3:
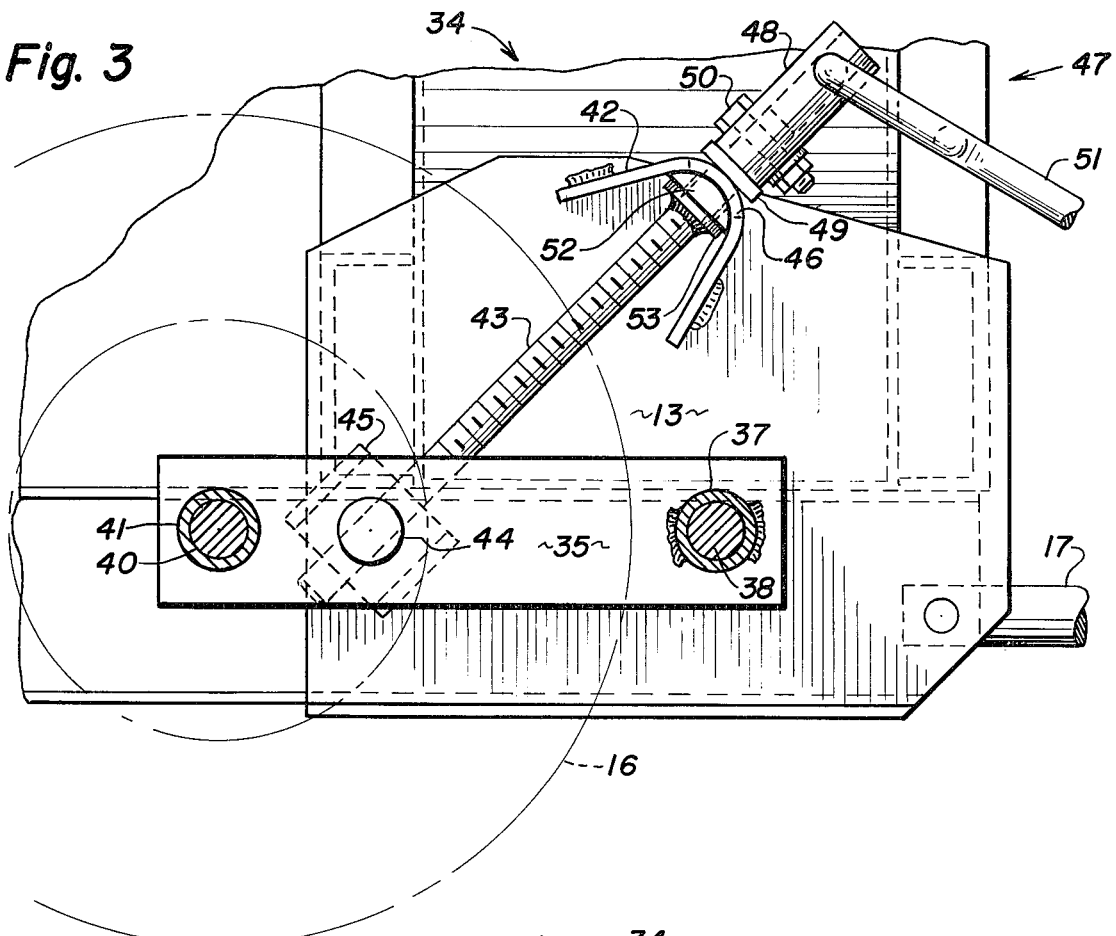
FIG. 3 is an enlarged fragmentary sectional view taken along line 3—3 of FIG. 1, showing the right wheel in its transport mode.
Figure 4:
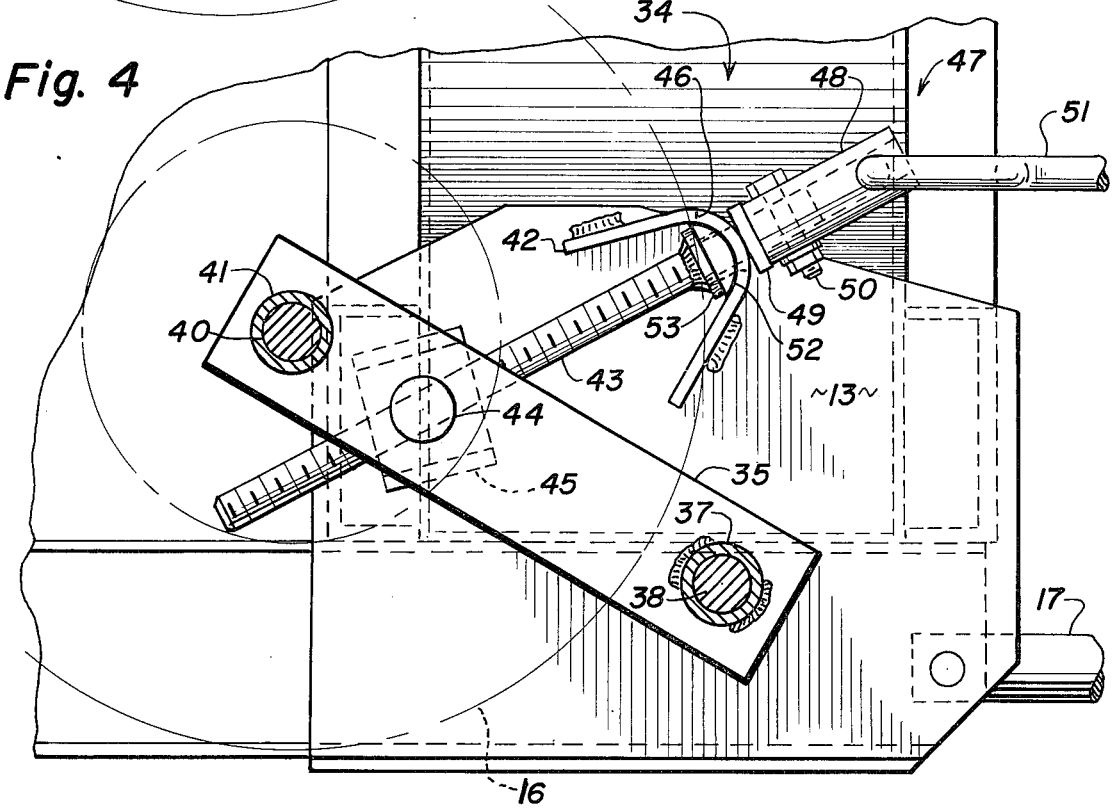
FIG. 4 is similar to and on the same scale as FIG. 3 with the right wheel being retracted so that the blower unit can rest on the ground.
Figure 5:
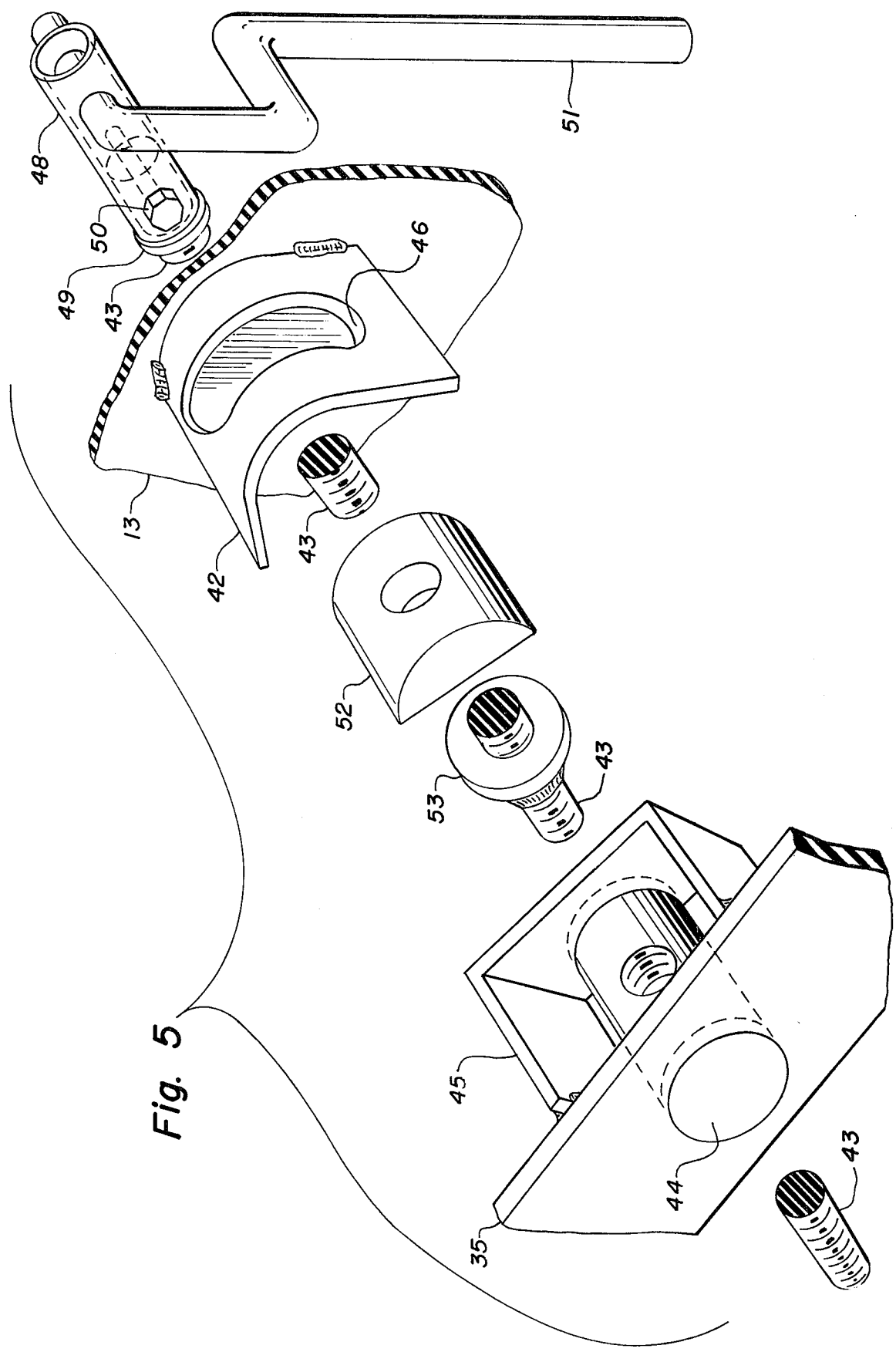
FIG. 5 is an enlarged, exploded perspective view of the improved adjustment mechanism and fragmentary portions of the blower frame and wheel arms associated therewith.

Now, in reference to FIGS. 3, 4 and 5, the adjustment mechanism 34 is seen as including an arcuate shaped bracket 42 mounted on the side of the frame 13, upwardly from the stub shaft 38, and positioned so as to open generally downwardly toward wheel axle 40 when the wheel 16 is in its transport position, as viewed in FIG. 3. Interconnecting the bracket 42 and the wheel mounting means is threaded rod 43. The lower end of rod 43 is threaded through a swivel nut 44, pivotally mounted within channel shape bracket 45. Bracket 45 is secured to the outboard side of inner arm 35, between axle 40 and stub shaft 38.

The rod 43 extends upwardly and rearwardly from the swivel nut 44 and passes through an enlongated slot 46 defined in the curved bracket 42 (best seen in FIG. 1). To manually rotate the threaded rod 43, handle 47 is provided at the upper end portion of the rod, above bracket 46. Handle 47 includes a tubular sleeve 48 attached at one end by bolt and nut 50 with the other end having a bar 51 extending therethrough. Inserted around threaded rod 43, between bracket 42 and sleeve 48, is washer 49.

Disposed on rod 43, below bracket 42, is engaging member 52 which is supported for movement along rod 43 by washer 53, weldably secured to the rod. The engaging member 52 is free to move about rod 43 and is shaped to conform to the shape of arcuate bracket 42 such that the engaging member 52 and bracket 43 form a mated relationship. This mated relationship distributes the forces, due to the weight of the blower unit 10, over a large area thereby resulting in less force per unit area and thus facilitating rotation of the rod 43.

To retract the transport wheel 16, the handle 47 is rotated in a clockwise direction as viewed in FIG. 1, whereby the rod 43 is threaded through the swivel nut 44, causing arms 35 and 36 and thus wheel 16 to pivot upwardly, about stub shaft 38, toward the bracket 42, resulting in the blower unit being vertically lowered relative to the ground. Reverse rotation of the rod 43, in a counterclockwise direction as viewed in FIG. 1, pivots the wheel 16 downwardly, engaging the ground, and thus raising the blower unit 10 to its transport position, as viewed in FIG. 3.

Upon actuation or rotation of rod 43, the lower end of the rod and swivel nut 44 pivot within bracket 45 while the upper end of rod 43 moves back and forth within slot 46. As the rod is moved within slot 46, the engaging member 52 follows the path defined by the contour of bracket 42. This unique design of the engaging member 52 in relation to the curved shaped bracket 42 allows for easy movement of the rod 43 and provides a stable base, independent of the wheel mounting, for supporting the blower unit 10 in a plurality of vertical positions relative to the ground.

Thus, it can be readily appreciated by those skilled in the art, that the present invention, as incorporated in the forage blower unit 10, enables the blower unit to be leveled on uneven ground, thereby facilitating the aligning of the discharge spout with the silo fill pipe. Further, it can be seen that the described structure is capable of supporting the unit in a stationary and stable manner in any of its disposed vertical positions.

It is though that the invention and many of its attendant advantages will be understood from the foregoing description and it will be apparent that various changes may be made in form, construction and arrangement of the improved adjusting mechanism without departing from the spirit and scope of the invention or sacrificing all of its material advantages, the form hereinbefore described being merely a preferred or exemplary embodiment thereof.

Having thus described the invention, what is claimed is:

1. In an agricultural machine having a frame and at least one ground engaging element movably mounted on said frame to support said frame at a plurality of vertical positions relative to the ground, an improved mechanisms for adjusting said frame to any of said vertical positions comprising:
   a. an arcuate shaped first member mounted on said frame;
   b. means interconnecting said first member to said ground engaging element and actuatable to cause relative movement between said ground engaging element and said frame;
   c. said interconnecting means is pivotally mounted at one end to said ground engaging element and extends through an opening defined in said first member;
   d. said interconnecting means including a second member shaped to be received by said first member in a mating relationship therewith such that the forces exerted on said interconnecting means by the weight of said agricultural machine is distributed over a large area.

2. The improved adjusting mechanisms as described in claim 1, wherein said interconnecting means includes a rod which moves within said opening in said first member during actuation of said interconnecting means.

3. The improved adjusting mechanism as described in claim 2, wherein said second member is mounted on said rod and movable therewith in mating relationship with said first member as said rod moves through said opening.

4. In an agricultural machine having a frame and at least one ground engaging element movably mounted on said frame to support said frame at a plurality of vertical positions relative to the ground, an improved mechanism for adjusting said frame to any of said vertical positions comprising:
   a. an arcuate shape first member mounted on said frame;
   b. means interconnecting said first member to said ground engaging element and actuatable to cause relative movement between said ground engaging element and said frame;
   c. said interconnecting means including a second member shaped to be received by said first member in a mating relationship therewith such that the forces exerted on said interconnecting means by the weight of said agricultural machine is distributed over a large area;
   d. said interconnecting means further including a rod extending through said first and second members, said second member being movable with said rod to maintain a mated relationship with said first member as said interconnecting means is actuated to adjust the frame relative to the ground.

5. The improved adjusting mechanism as described in claim 4, wherein said first member is mounted on said frame to open generally downwardly and said second member is mounted on said rod below said first member.

6. The improved adjusting mechanism as described in claim 5, wherein said ground engaging element is pivotally mounted on said frame for pivotal movement relative thereto such that upon actuation of said interconnecting means said rod pivots about said ground engaging element as said ground engaging element pivots about said frame.

7. An improved adjustment mechanism for adjusting an agricultural implement frame between a plurality of vertical positions relative to the ground, the improved mechanism comprising:
   a. a ground engaging element mounted on said frame for movement relative thereto to dispose the same at any of said plurality of vertical positions to the ground;
   b. an arcuate shaped bracket mounted on said frame so as to open generally downwardly;
   c. means interconnecting said ground engaging element to said bracket and being actuatable to cause relative movement between said ground engaging element and said bracket for adjusting the vertical position of said frame, said interconnecting means including an engaging member below said bracket which conforms to the shape of said bracket, said engaging member being positioned in mated relationship with said bracket such that the forces exerted on said interconnecting means by the weight of said frame are distributed over a large area resulting in less per unit area;
   d. said interconnecting means further includes a rod and means for pivotally mounting one end of said rod on said ground engaging element, said rod extending upwardly from said pivotal mounting means through a slot defined in said bracket and is movable within said slot as said ground engaging element is moved relative to said frame upon actuation of said interconnecting means.

8. The improved adjusting mechanism as described in claim 7, wherein a portion of said rod is threaded and said pivotal mounting means is a swivel nut, said threaded rod portion being received within said swivel nut upon actuation of said interconnecting means.

9. The improved adjusting mechanism as described in claim 8, wherein said engaging member is movable about said rod and along said rod.

10. The improved adjusting mechanism as described in claim 7, wherein said engaging member is mounted on said rod in such a way that a constant mated relationship exist between said engaging member and said bracket during actuation of said interconnecting means.

11. An improved mechanism for vertically adjusting an agricultural implement frame between a plurality of vertical positions relative to the ground, said improved mechanism comprising:
   a. a ground engaging element;
   b. means for pivotally mounting the ground engaging element on said frame; and
   c. adjustment means interconnecting said frame to said pivotal mounting means and being actuatable to cause relative movement between said frame and said ground engaging element;
   d. said adjusting means includes a downwardly facing curved shaped bracket mounted on said frame, an adjusting rod threadably coupled at one end to said pivotal mounting means and at its other end to said bracket and an engaging member mounted on said rod below said bracket and shaped to conform to the configuration defined by said bracket such that upon actuation of said adjusting means said rod is moved relative to said pivotal mounting means causing said ground engaging element to move relative to the frame to thereby adjust the position of the frame relative to the ground.

12. The improved mechanism as described in claim 11, wherein rotation of said rod causes relative movement between said bracket and said ground engaging element.

13. The improved mechanism as described in claim 12, wherein said engaging member is rotatable about said rod and moves with said rod as said rod is rotated to maintain a constant mated relationship with said bracket whereby the forces imposed thereon by the weight of the said frame are distributed over said engaging member at each of said plurality of vertical positions of said frame.

* * * * *